Nov. 12, 1957   J. SHIFFMAN   2,812,688
MAGNIFIERS AND EYE-SHIELDS
Filed Jan. 17, 1955
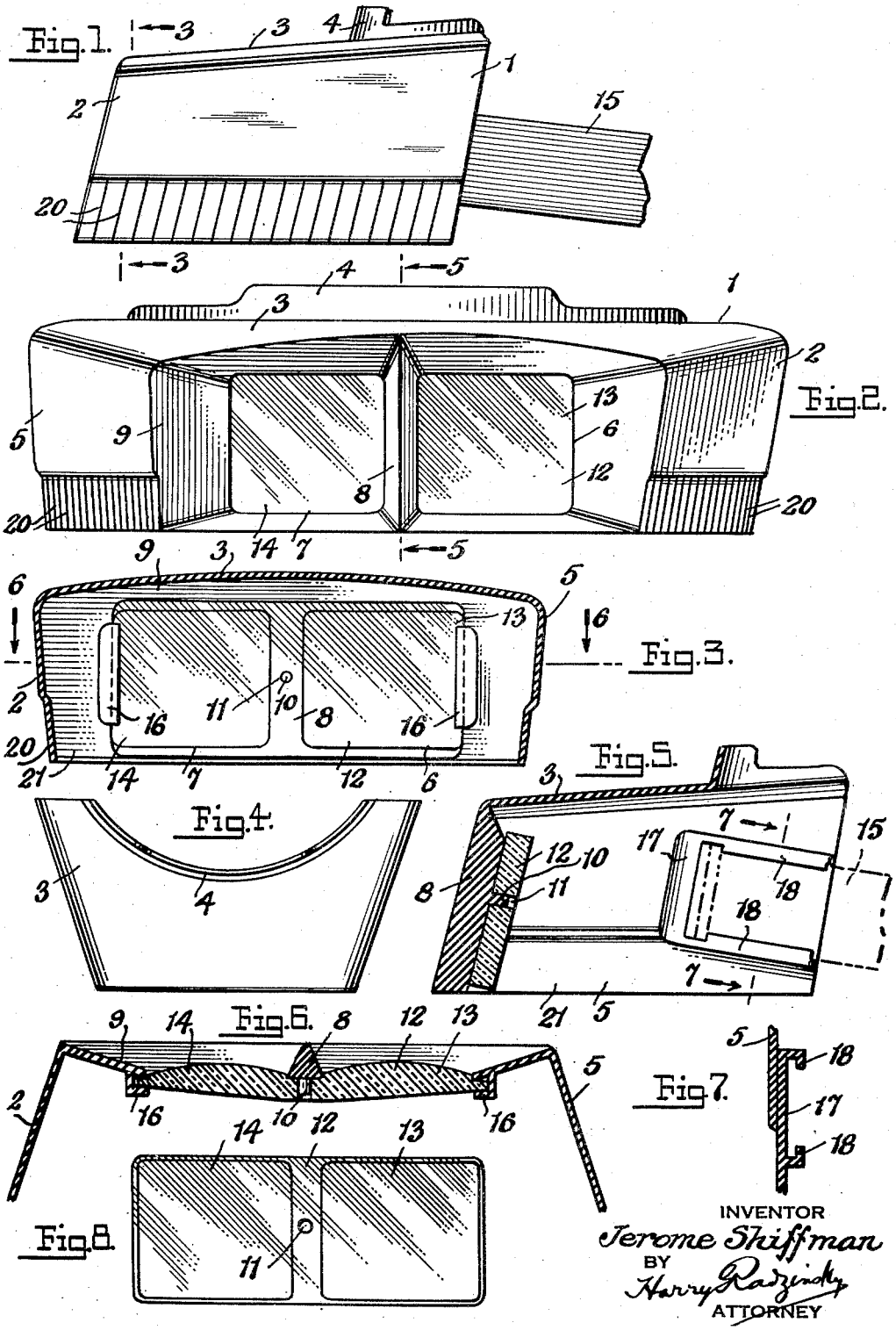
INVENTOR
Jerome Shiffman
BY
Harry Radzinsky
ATTORNEY

United States Patent Office 2,812,688
Patented Nov. 12, 1957

2,812,688

MAGNIFIERS AND EYE-SHIELDS

Jerome Shiffman, New York, N. Y.

Application January 17, 1955, Serial No. 482,147

1 Claim. (Cl. 88—39)

This invention relates to magnifiers and eye-shields, and has for one of its objects the provision of an article of this character which can be inexpensively manufactured; in which the magnifying or reducing lenses can be speedily changed when required to adapt them to differences in the eyesight of various users, and with which the lenses can be produced in the form of a single strip easily fitted into position within the holder and as easily removed when required.

It is another object of the invention to provide an article of this kind which can be composed of plastic, rubber or other soft or flexible material so that the possibility of breakage of the same and the lenses carried by it will be greatly minimized.

It is another object of the invention to provide in a magnifier of this character, an arrangement by which the lenses will be in the form of a single, integral strip of plastic material, which lenses will thus be capable of being inexpensively made and will resist breakage.

With these and other objects to be hereinafter set forth in view, I have devised the arrangement of parts to be more particularly set forth and pointed out in the claims appended hereto.

In the accompanying drawing, wherein an illustrative embodiment of the invention is disclosed, Fig. 1 is a side elevational view of a combined magnifier and protective shield, constructed in accordance with the invention;

Fig. 2 is a front elevational view of the same;

Fig. 3 is a sectional view, taken substantially on the line 3—3 of Fig. 1, looking in the direction of the arrows;

Fig. 4 is a top plan view, on a reduced scale of the magnifier and eye-shield;

Fig. 5 is a sectional view, taken substantially on the line 5—5 of Fig. 2, looking in the direction of the arrows;

Fig. 6 is a sectional view, taken substantially on the line 6—6 of Fig. 3, looking in the direction of the arrows;

Fig. 7 is a sectional view, taken substantially on the line 7—7 of Fig. 5, looking in the direction of the arrows, and Fig. 8 is a front elevational view of the lens strip.

Referring to the drawing, 1 indicates generally the body or housing of the magnifier and eye-shield. The same is preferably, but not necessarily, composed of a relatively soft, springy material, such as the soft plastic known as polyethelene, rubber, synthetic rubber, or other suitable, resilient, non-fracturable material. As a result, the body or housing 1 is capable of handling and hard use without the possibility of becoming damaged.

The housing includes a top wall 3 and the integrally formed side walls respectively indicated at 2 and 5. The housing is open at the bottom as indicated at 21. The side walls may be fluted as shown at 20 in the drawing, or otherwise ornamentally decorated or shaped. The body or housing may be of one-piece molded construction. Extending upwardly from the top wall 3 is an arcuate, vertical wall or flange against which the forehead of the wearer rests when the device is worn.

The front wall of the housing is indicated at 9, and the same is preferably inset or depressed and formed with two substantially similar, spaced rectangular viewing openings indicated respectively at 6 and 7. A center post 8 is formed as a part of the front wall 9 and extends vertically between and acts to separate the two viewing windows 6 and 7.

Located behind the front wall 9 is a lens strip 12, shown in detail in Figs. 6 and 8. The lens is preferably in the form of a single strip of molded, transparent plastic and is formed with the two lens areas indicated respectively at 13 and 14 which areas correspond substantially in shape to and are adapted to respectively register with the viewing openings 6 and 7 when the lens strip is fitted into position at the back of the front wall 9 and within the housing substantially as shown in Figs. 2 and 6. The lens strip can of course, be composed of glass if desired. It will be noted that the lens strip 12 is provided at a point located centrally between the lens areas with a hole indicated at 11. When the lens strip is fitted in place at the back of the front wall 9 of the housing, the hole 11 fits over a rearwardly-projecting pin 10 formed on the center post 8, thus properly positioning the lens strip and restraining it against downward movement out of the holder or housing 1. The lens strip is additionally held in place by means of a pair of grooved, retaining strips or channel members 16 extending from the back of the front wall 9. These grooved retaining strips 16 receive the opposite ends of the lens strip and serve to hold it securely in place against the back of the front wall and with its lens areas in registration with the viewing openings 6 and 7.

The nature of the material of which the body or housing 1 is made is such that the retaining strips 16, which are formed as an integral part of the body, can be sprung apart to permit of the easy insertion of the opposite marginal edges of the lens strip into them. Similarly, when it is desired to remove the lens strip, the front portion of the housing can be readily flexed to enable the lens strip to be removed. Thus, it is a simple matter to replace the lens strip whenever desired or to substitute strips with lenses of different magnifications.

The device can be held in place by any suitable means, such as by a head-encircling band or strap, which can be adjustable, or can be composed of elastic material, or can be both elastic and adjustable. Such a band is disclosed in part at 15. Provided on the inner surfaces of the side walls 2 and 5 adjacent to the rear end of the body of the magnifier, are channel members 17 having flanged edges 18 under which the edges of the retaining strap 15 extend, which strap can be anchored in these holders in any suitable manner.

From the foregoing, the structure and operation of the improved magnifier and eye-shield will be readily understood. The housing or body of the device is of such shape that it can be worn over eye-glasses, and in fact constitutes a protective shield therefor, particularly since it is made of soft, shock-absorbing material.

Since the lenses are in the form of a unitary strip, the same are readily fitted in place and as easily removed in the manner herein described. In fact, a plurality of lens strips can be supplied with the magnifier if desired, so that the strips can be changed whenever different degrees of magnification are required; or a dealer might keep a substantial number of these strips in stock so that a purchaser can, by test, select the lens strip best adapted for his eyesight. Since it is suggested that these lens strips be composed of molded plastic, it is apparent that they can be inexpensively made and sold and are practically unbreakable.

The body of the magnifier being of soft, springy material, it can be roughly handled without the possibility of damage and it will provide immeasureable protection when in position of wear.

Having described a single embodiment of the invention, it is obvious that the same is not to be restricted thereto, but is broad enough to cover all structures coming within the scope of the annexed claim.

What I claim is:

A binocular magnifier comprising, an eye shield body wholly composed of a soft, flexible material, said body having a top, a front wall, side walls and an open bottom, the front wall being provided with a pair of spaced viewing openings separated by a central post, spaced eye lenses formed on a single strip of transparent plastic material, said lens strip being of a size to enable it to extend over the viewing openings and over the post between them when the strip is positioned against the rear face of the front wall, means for registering the lenses on the strip with the viewing openings consisting of a headless pin formed on and extending from the rear side of the post and permanently secured thereto, said pin entering an opening provided in the lens strip between the lenses thereon, the front wall of the body being provided at its rear with an integrally-formed pair of flanges engaging the opposite ends only of the lens strip, the integral formation of said flanges with the body and the flexibility of the body, permitting disengagement of the lens strip from the body by causing the flanges to spread apart by flexure of the body to thereby free the lens strip.

References Cited in the file of this patent

UNITED STATES PATENTS

| | | |
|---|---|---|
| 782,519 | Pappenhagen | Feb. 14, 1905 |
| 2,182,104 | Wilen et al. | Dec. 5, 1939 |
| 2,263,116 | Andrews | Nov. 18, 1941 |
| 2,321,004 | Branson | June 8, 1943 |
| 2,321,159 | Ryan | June 8, 1943 |
| 2,349,013 | Sparling | May 16, 1944 |